(12) United States Patent
Inuzuka et al.

(10) Patent No.: US 11,898,615 B2
(45) Date of Patent: Feb. 13, 2024

(54) CYLINDER APPARATUS

(71) Applicant: HITACHI ASTEMO, LTD., Hitachinaka (JP)

(72) Inventors: Toshihiro Inuzuka, Ebina (JP); Urban Anta Carlos, Schwaig-Oberding (DE); Atsushi Maeda, Fujisawa (JP); Koji Minamino, Fukushima (JP); Aakash Patwa, Canton, MI (US)

(73) Assignee: HITACHI ASTEMO, LTD., Ibaraki (JP)

( * ) Notice: Subject to any disclaimer, the term of this patent is extended or adjusted under 35 U.S.C. 154(b) by 482 days.

(21) Appl. No.: 17/054,943

(22) PCT Filed: May 14, 2019

(86) PCT No.: PCT/JP2019/019046
§ 371 (c)(1),
(2) Date: Nov. 12, 2020

(87) PCT Pub. No.: WO2019/221098
PCT Pub. Date: Nov. 21, 2019

(65) Prior Publication Data
US 2021/0246961 A1  Aug. 12, 2021

(30) Foreign Application Priority Data
May 16, 2018  (JP) .................... 2018-094513

(51) Int. Cl.
*F16F 13/00* (2006.01)
*B60G 15/06* (2006.01)
*B60G 17/08* (2006.01)

(52) U.S. Cl.
CPC .......... *F16F 13/007* (2013.01); *B60G 15/061* (2013.01); *B60G 17/08* (2013.01);
(Continued)

(58) Field of Classification Search
CPC .. F16F 13/007; F16F 2222/12; F16F 2224/02; F16F 2230/36; F16F 2230/42;
(Continued)

(56) References Cited

U.S. PATENT DOCUMENTS

| 4,312,499 A | 1/1982 | Wossner et al. |
| 4,345,748 A * | 8/1982 | Wossner ................. F16F 9/483 267/226 |

(Continued)

FOREIGN PATENT DOCUMENTS

| CN | 104879419 | 9/2015 |
| DE | 7804572 | 2/1978 |

(Continued)

OTHER PUBLICATIONS

Office Action issued in CN Application No. 201980032680.6 dated Sep. 13, 2021 (with English translation).
(Continued)

*Primary Examiner* — Robert A. Siconolfi
*Assistant Examiner* — James K Hsiao
(74) *Attorney, Agent, or Firm* — Wenderoth, Lind & Ponack, L.L.P.

(57) ABSTRACT

A cylinder apparatus is provided with a stopper mechanism that operates when a piston rod extends and moves toward an upper end portion in an inner cylinder. This stopper mechanism includes a second cylinder provided movably relative to the piston rod and including a bottom portion on an upper end side in the inner cylinder and a cylinder portion extending from the bottom portion toward a lower end side, and a second piston provided so as to be able to move along with a movement of the piston rod to be fitted to the second cylinder. While being configured in this manner, the cylinder
(Continued)

apparatus is configured in such a manner that a spring member 21 is provided between the second cylinder and a rod guide.

6 Claims, 8 Drawing Sheets

(52) U.S. Cl.
CPC ...... *B60G 2202/30* (2013.01); *B60G 2204/62* (2013.01); *B60G 2206/41* (2013.01); *B60G 2500/104* (2013.01); *B60G 2600/21* (2013.01); *B60G 2800/162* (2013.01); *F16F 2222/12* (2013.01); *F16F 2224/02* (2013.01); *F16F 2228/066* (2013.01); *F16F 2230/36* (2013.01); *F16F 2230/42* (2013.01); *F16F 2232/08* (2013.01); *F16F 2234/02* (2013.01)

(58) Field of Classification Search
CPC ............. F16F 2228/066; F16F 2232/08; F16F 2234/02; B60G 15/061; B60G 17/08; B60G 13/08; B60G 2202/30; B60G 2204/62; B60G 2206/41; B60G 2500/104; B60G 2600/21; B60G 2800/162
See application file for complete search history.

(56) References Cited

U.S. PATENT DOCUMENTS

| | | | | |
|---|---|---|---|---|
| 4,852,703 | A * | 8/1989 | Nishimoto | F16F 9/49 188/284 |
| 4,901,828 | A * | 2/1990 | Schmidt | F16F 9/49 188/322.15 |
| 5,409,087 | A * | 4/1995 | Angermann | F16F 9/49 188/317 |
| 5,810,130 | A | 9/1998 | Mc Candless | |
| 8,418,820 | B2 * | 4/2013 | Kim | F16F 9/49 188/322.22 |
| 10,533,624 | B2 * | 1/2020 | Ishimaru | F16F 9/49 |
| 2011/0000753 | A1 * | 1/2011 | Kim | F16F 9/49 188/297 |
| 2015/0090548 | A1 * | 4/2015 | Yamanaka | F16F 9/3271 29/434 |
| 2015/0152938 | A1 * | 6/2015 | Park | F16F 9/3405 188/280 |
| 2015/0247549 | A1 * | 9/2015 | Takeno | F16F 9/585 188/297 |
| 2016/0288869 | A1 * | 10/2016 | Miwa | F16F 9/465 |

FOREIGN PATENT DOCUMENTS

| | | |
|---|---|---|
| DE | 3010690 | 9/1981 |
| JP | 2006-177531 | 7/2006 |
| JP | 2015-068428 | 4/2015 |
| JP | 2015-72052 | 4/2015 |

OTHER PUBLICATIONS

Office Action dated Apr. 25, 2022 in corresponding German Patent Application No. 11 2019 002 456.6, with English Translation.
Office Action dated Sep. 7, 2021 in corresponding JP Application No. 2020-519644 with Machine Translation.
International Search Report dated Aug. 13, 2019 in International Application No. PCT/JP2019/019046 with English-language translation.
Written Opinion of the International Searching Authority dated Aug. 13, 2019 in International Application No. PCT/JP2019/019046.

* cited by examiner

CYLINDER APPARATUS

TECHNICAL FIELD

The present invention relates to a cylinder apparatus mounted on a vehicle such as a four-wheeled automobile, and preferably used to absorb a vibration of the vehicle.

BACKGROUND ART

Generally, a vehicle such as a four-wheeled automobile is equipped with a cylinder apparatus as a hydraulic shock absorber between each of wheels (an axle side) and a vehicle body individually, and the cylinder apparatus is configured to absorb a vibration of the vehicle with the aid of extension and compression of a piston rod relative to a cylinder (for example, refer to PTL 1). This type of cylinder apparatus is provided with a hydraulic stopper mechanism configured to prevent the piston rod from exceeding a full extension limit by restricting a flow of the hydraulic oil when the piston rod largely extends.

CITATION LIST

Patent Literature

[PTL 1] U.S. Pat. No. 8,418,820

SUMMARY OF INVENTION

Technical Problem

Then, the above-described stopper mechanism is configured in such a manner that a communication passage is formed at a free piston provided at the distal end of a rebound spring, and the communication passage of the free piston is blocked by a stopper provided on the piston rod when the piston rod largely extends. According to this configuration, the flow of the hydraulic oil is stopped when the communication passage of the free piston is blocked by the stopper, and therefore a resistance force against the extension of the piston rod undesirably suddenly rises. Further, this configuration leads to continuous restriction maintained on the flow of the hydraulic oil by the stopper until the stopper is separated from the free piston when the piston rod compresses from the full extension state. As a result, the above-described cylinder apparatus has a problem of being unable to stabilize the damping force due to the resistance force generated during the extension/compression operation of the piston rod, thereby impairing ride comfort.

Solution to Problem

The present invention has been made in consideration of the above-described problem, and an object thereof is to provide a cylinder apparatus configured to be able to control a resistance force during full extension of a piston rod and a compression operation from the full extension, thereby acquiring excellent ride comfort.

To achieve the above-described object, according to one aspect of the present invention, a cylinder apparatus includes a first cylinder sealingly containing hydraulic fluid therein, a first piston slidably fitted in the first cylinder and defining an inside of this first cylinder into a rod-side chamber and a bottom-side chamber, a piston rod coupled with the first piston, a closing member provided on one end side of the first cylinder and configured to close the first cylinder with the piston rod inserted therethrough, and a stopper mechanism configured to operate when the piston rod extends and moves toward an end portion inside the first cylinder. The stopper mechanism includes a second cylinder provided movably relative to the piston rod and including a bottom portion on the one end side of the first cylinder and a cylinder portion extending from this bottom portion toward the other end side, and a second piston provided so as to be able to move along with a movement of the piston rod to be fitted to the second cylinder. A spring member is provided between the second cylinder and the closing member.

According to the one aspect of the present invention, the cylinder apparatus can control the resistance force during the full extension of the piston rod and the compression operation from the full extension, thereby acquiring excellent ride comfort.

DESCRIPTION OF EMBODIMENTS

In the following description, a cylinder apparatus according to an embodiment of the present invention will be described in detail with reference to FIGS. 1 to 11 based on an example when the cylinder apparatus is applied to a hydraulic shock absorber. In each of the drawings, various kinds of passages are illustrated in a manner larger than reality so as to facilitate a better understanding of the shapes of the various kinds of passages and the flows of hydraulic oil therein.

Figure 1:
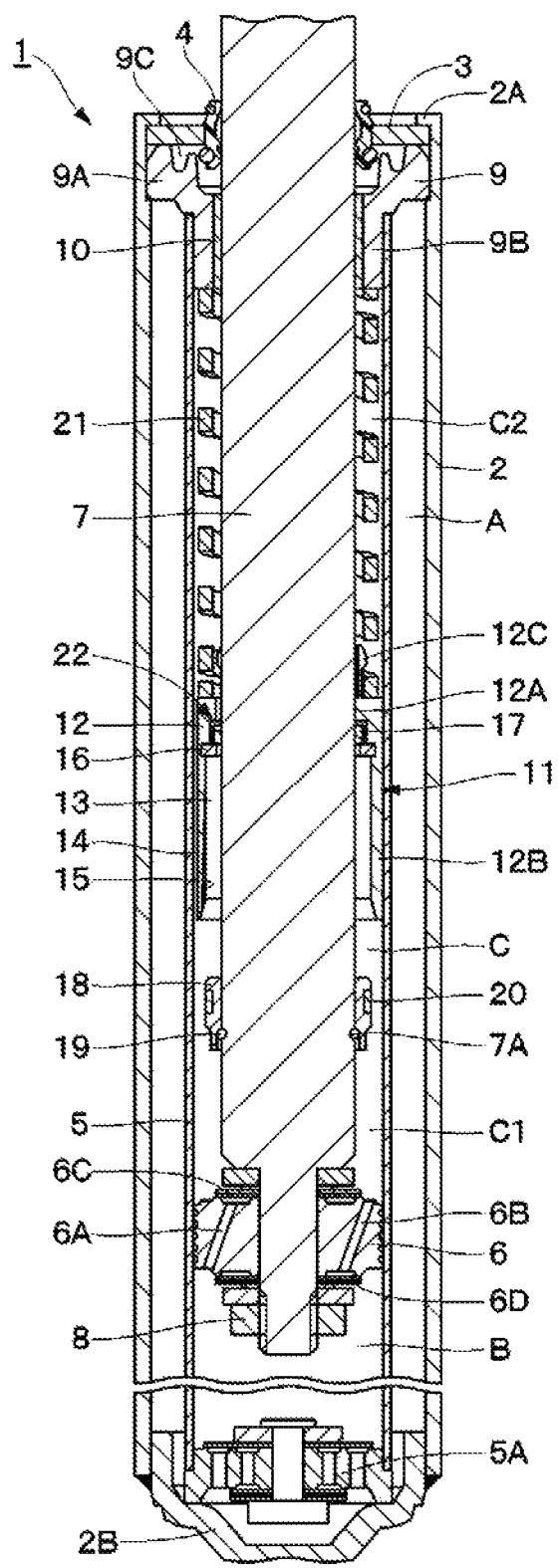
FIG. 1 is a vertical cross-sectional view of a hydraulic shock absorber as a cylinder apparatus according to an embodiment of the present invention.

In FIG. 1, a hydraulic shock absorber 1 is configured as a twin-tube shock absorber while including a cylindrical outer cylinder 2 forming an outer shell of the hydraulic shock absorber 1, an inner cylinder 5, which will be described below, a first piston 6, a piton rod 7, a rod guide 9, and a stopper mechanism 11.

The outer cylinder 2 of the hydraulic shock absorber 1 has an opening end on one end side thereof (the upper end in FIG. 1) and a closed end closed by a bottom cap 2B on the lower end side as the other end side. A crimp portion 2A bent radially inward is provided on the opening end (the upper end) side of the outer cylinder 2, and this crimp portion 2A holds a cover member 3 closing the opening end side of the outer cylinder 2 in a state preventing the cover member 3 from being detached off.

The cover member 3 made of an annular disk is fixed on the outer peripheral side thereof by the crimp portion 2A of the outer cylinder 2 in a state in abutment with the rod guide 9 for closing the opening end (upper end) side of the outer cylinder 2, which will be described below. A rod seal 4 made from an elastic material is attached to the inner peripheral side of the cover member 3, and this rod seal 4 seals between the piston rod 7, which will be described below, and the cover member 3.

The inner cylinder 5 as a first cylinder is provided coaxially in the outer cylinder 2, and the other end (the lower end) side of this inner cylinder 5 is fixed to the above-described bottom cap 2B side in a fitted state via a bottom valve 5A. The rod guide 9 is attached to the inner periphery of the one end (the upper end) side of the inner cylinder 5 by being fitted thereto. Hydraulic oil (oil fluid) as hydraulic fluid is sealingly contained in the inner cylinder 5. Not only the oil fluid but also, for example, water with an additive mixed therein can be used as the hydraulic fluid.

An annular reservoir chamber A is formed between the inner cylinder 5 and the outer cylinder 2, and gas is sealingly contained in this reservoir chamber A together with the above-described hydraulic oil. This gas may be air in an atmospheric-pressure state, or gas such as compressed nitrogen gas may be used as it. At the time of compression (a compression stroke) of the piston rod 7, the gas in the reservoir chamber A is compressed so as to compensate for the volume corresponding to an entry of this piston rod 7.

The first piston 6 is slidably fitted in the inner cylinder 5. This first piston 6 divides the inside the inner cylinder 5 (the first cylinder) into two chambers, a bottom-side chamber B and a rod-side chamber C. Further, oil passages 6A and 6B, which can establish communication between the bottom-side chamber B and the rod-side chamber C, are formed at the first piston 6. Further, a compression-side disk valve 6C is arranged on the upper end surface of the first piston 6. The compression-side disk valve 6C generates a predetermined damping force by applying a resistance force to the hydraulic oil flowing in the oil passage 6A when the first piston 6 is slidably displaced downward due to the compression of the piston rod 7. On the other hand, an extension-side disk valve 6D is arranged on the lower end surface of the first piston 6. The extension-side disk valve 6D generates a predetermined damping force by applying a resistance force to the hydraulic oil flowing in the oil passage 6B when the first piston 6 is slidably displaced upward due to the extension of the piston rod 7.

The other end (lower end) side of the piston rod 7 is coupled with the first piston 6. More specifically, the lower end side of the piston rod 7 is inserted in the inner cylinder 5, and is attached to the inner peripheral side of the first piston 6 with use of a nut 8 and the like. Further, the upper end side of the piston rod 7 protrudes to outside via the rod guide 9, the cover member 3, and the like in an extendable and compressible manner. An annular groove 7A is formed on the piston rod 7 at a position spaced apart by a predetermined distance from the position at which the first piston 6 is attached. A stop ring 19, which will be described below, is fixed in this annular groove 7A in an externally fitted state.

The rod guide 9 is provided on the upper end side corresponding to the one end side of the inner cylinder 5 (the first cylinder), and forms a closing member that closes the inner cylinder 5 with the piston rod 7 inserted therethrough. The rod guide 9 is formed into a stepped cylindrical shape, and is fixed by being fittedly inserted on the upper end side of the outer cylinder 2 and the upper end side of the inner cylinder 5. Due to this configuration, the rod guide 9 serves to position the upper portion of the inner cylinder 5 at the center of the outer cylinder 2, and also axially slidably guide (lead) the piston rod 7 by allowing the piston rod 7 to be inserted therethrough on the inner peripheral side thereof. Further, the rod guide 9 forms a support structure that supports the cover member 3 from inside when this cover member 3 is fixedly crimped from outside by the crimp portion 2A of the outer cylinder 2.

The rod guide 9 is formed into a stepped cylindrical shape defined by a large-diameter portion 9A and a small-diameter portion 9B. The large-diameter portion 9A is positioned on the upper side, and is fittedly inserted on the inner peripheral side of the outer cylinder 2. The small-diameter portion 9B is positioned on the lower side of this large-diameter portion 9A, and is fittedly inserted on the inner peripheral side of the inner cylinder 5. A cylindrical guide portion 10 is disposed on the inner peripheral side of the small-diameter portion 9B. The guide portion 10 axially slidably guides the piston rod 7 inserted through inside the inner cylinder 5. Further, the upper end side of a spring member 21, which will be described below, is in abutment with the small-diameter portion 9B of the rod guide 9. The spring member 21 may be attached by being fitted to the small-diameter portion 9B of the rod guide 9 or may be attached by being press-fitted in the inner cylinder 5.

On the other hand, the large-diameter portion 9A of the rod guide 9 includes an annular oil reservoir chamber 9C provided on the upper surface side of the large-diameter portion 9A that faces the cover member 3. The oil reservoir chamber 9C surrounds the piston rod 7. When the hydraulic oil (or the gas mixed in this hydraulic oil) in the rod-side chamber C is leaked via, for example, a slight space between the piston rod 7 and the guide portion 10, this oil reservoir chamber 9C serves to provide a space for temporarily reserving this leaked hydraulic oil and the like.

Further, a communication passage (not illustrated) constantly in communication with the reservoir chamber A on the outer cylinder 2 side is provided at the large-diameter portion 9A of the rod guide 9, and this communication passage serves to guide the hydraulic oil (including the gas) reserved in the oil reservoir chamber 9C to the reservoir chamber A on the outer cylinder 2 side. A check valve (not illustrated) is disposed in the oil reservoir chamber 9C. When the leaked oil increases in the oil reservoir chamber 9C and overflows therefrom, this check valve serves to permit this overflowing hydraulic oil to flow toward the communication passage of the rod guide 9 (the reservoir chamber A) and prohibit a flow in the opposite direction therefrom.

Next, the configuration of the stopper mechanism 11, which constitutes a characteristic feature of the present embodiment, will be described.

The stopper mechanism 11 is configured to operate when the piston rod 7 extends and moves toward the one end portion in the inner cylinder 5. More specifically, the stopper mechanism 11 is provided in the inner cylinder 5, and is configured to operate in a manner that will be described below when the piston rod 7 extends outward from the outer cylinder 2 and the inner cylinder 5 and moves toward the end portion (a full extension position) in the inner cylinder 5, thereby stopping the extension operation of the piston rod 7 to thus prevent the piston rod 7 from exceeding a full extension limit while applying stepwise damping (hydraulic resistance) to this extension operation.

The stopper mechanism 11 includes a second cylinder 12, a second piston 18, the spring member 21 (a rebound spring), and a passage area variable mechanism 22. The second cylinder 12 is provided movably relative to the piston rod 7. The second piston 18 is positioned on the rod guide 9 side with respect to the first piston 6 and is provided on the outer peripheral side of the piston rod 7. The spring member 21 is provided between the second cylinder 12 and the rod guide 9. The passage area variable mechanism 22 changes the passage area of a first communication passage 13.

The second cylinder 12 is provided movably relative to the piston rod 7. On the other hand, the second cylinder 12 is mounted on the lower end portion of the spring member 21, and can move vertically in the inner cylinder 5 according to extension and compression of the spring member 21. Further, the second cylinder 12 divides the inside of the rod-side chamber C into a chamber C1 on the first piston 6 side and a chamber C2 on the rod guide 9 side as a chamber on the closing member side. The second cylinder 12 is made from, for example, an oil-resistant, wear-resistant, and elastic resin material. The second cylinder 12 may be made from a metallic material without being limited to the resin material. However, in the case where the second cylinder 12 is made from the metallic material, a resin piston ring or the like should be provided between the second cylinder 12 and the inner cylinder 5.

As illustrated in FIGS. 2 to 4, 8, and the like, the second cylinder 12 includes an annular bottom portion 12A and a cylindrical cylinder portion 12B. The bottom portion 12A is positioned on the upper end side (the one end side) in the inner cylinder 5. The cylinder portion 12B extends from around this bottom portion 12A toward the lower end side (the other end side). A fitted portion 12C extending toward the upper end side is provided on the radially inner side of the bottom portion 12A.

The bottom portion 12A is formed as an annular member having an outer diameter dimension slightly smaller than the inner cylinder 5 and an inner diameter dimension slightly larger than the piston rod 7. Inner passages 12A1 are provided at three portions on the inner peripheral portion of the bottom portion 12A at circumferential intervals (refer to FIGS. 3 and 4). The inner passages 12A1 form a part of the first communication passage 13, which will be described below. On the other hand, second communication passages 14, which will be described below, are provided at three portions on the outer peripheral portion of the bottom portion 12A at circumferential intervals. Further, an annular valve seat 12A2 is formed on the lower surface of the bottom portion 12A. An upper surface 17A of an annular valve member 17, which will be described below, abuts against the annular valve seat 12A2 so as to be able to open and close the valve.

The cylinder portion 12B is formed as a cylindrical member having an outer diameter dimension slightly smaller than the inner cylinder 5. Further, the inner peripheral surface of the cylindrical portion 12B includes a small-diameter portion 12B1, a large-diameter portion 12B2, and an attachment groove portion 12B3. The small-diameter portion 12B1 is disposed at the upper end portion. The large-diameter portion 12B2 is disposed on the lower end side with respect to this small-diameter portion 12B1 and is formed so as to have a larger diameter than the small-diameter portion 12B1. The attachment groove portion 12B3 is positioned between the small-diameter portion 12B1 and the large-diameter portion 12B2, and is formed so as to have a lager diameter than the large-diameter portion 12B2. The annular valve member 17 is disposed on the inner peripheral side of the small-diameter portion 12B1. An annular member 16, which will be described below, is fitted on the inner peripheral side of the attachment groove portion 12B3.

On the other hand, restrictor oil grooves 15, which will be described below, are provided at three portions on the inner peripheral side of the large-diameter portion 12B2 at circumferential intervals. Further, a gradually flaring taper surface portion 12B4 is formed at the lower end portion of the large-diameter portion 12B2. This taper surface portion 12B4 serves to smoothly guide, into the large-diameter portion 12B2, the second piston 18 moving upward together with the piston rod 7 when this piston rod 7 extends.

The fitted portion 12C is formed by dividing a cylindrical body extending from the radially inner side of the bottom portion 12A toward the upper end side into a plurality of pieces, such as three pieces, in the circumferential direction with large spaces generated therebetween. Therefore, the fitted portion 12C can be radially elastically deformed. Further, an engagement portion 12C1 is provided at the upper end portion of the fitted portion 12C in a manner protruding radially outward. The engagement portion 12C1 engages with the other end portion of the spring member 21 from the inner peripheral side. Due to this configuration, the second cylinder 12 can move axially in the inner cylinder 5 together with the lower end portion (the free end) of the spring member 21.

Then, the first communication passage 13, the second communication passages 14, and the restrictor oil grooves 15 are provided at the second cylinder 12. These passages will be described now.

Figure 8:
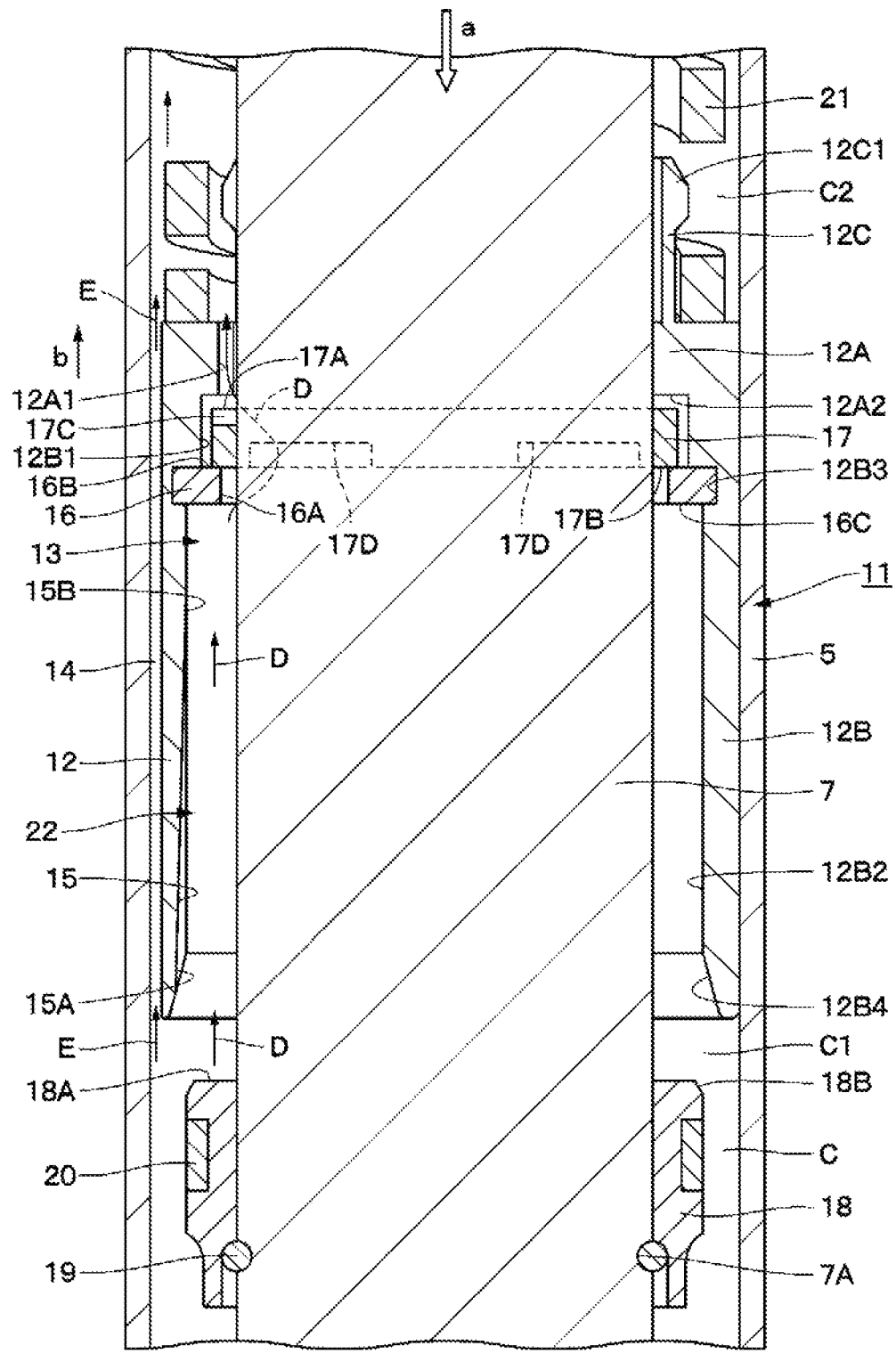
FIG. 8 is a vertical cross-sectional view illustrating flows of hydraulic oil in a first communication passage and a second communication passage during a compression stroke of a piston rod in an enlarged manner.
Figure 9:
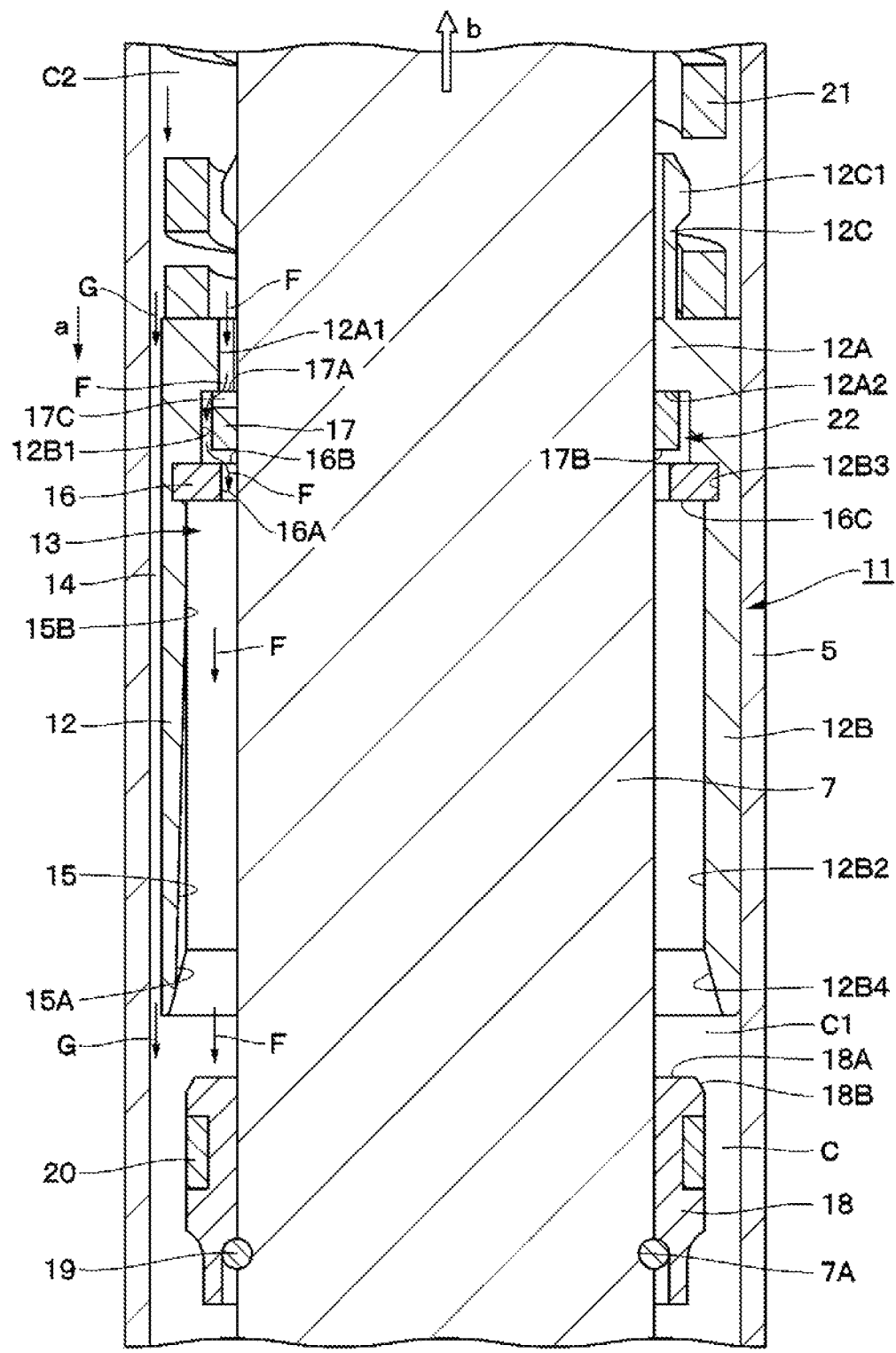
FIG. 9 is a vertical cross-sectional view illustrating a flow of the hydraulic oil when the second cylinder and the second piston are separated from each other in an extension stroke of the piston rod in an enlarged manner.

As illustrated in FIGS. 8 and 9, the first communication passage 13 serves to establish the communication between the inside of the second cylinder 12 and the chamber C2 on the rod guide 9 side. The first communication passage 13 is formed as a passage extending through each of the inner passages 12A1 provided at the bottom portion 12A of the second cylinder 12, the small-diameter portion 12B1 and the large-diameter portion 12B2 of the cylinder portion 12B, and between an inner peripheral surface 16A of the annular member 16, which will be described below, and the outer peripheral surface of the piston rod 7. In the first communication passage 13, the area of the passage for the hydraulic oil is controlled (adjusted) by the passage area variable mechanism 22, which will be described below. Further, the first communication passage 13 is blocked when the second piston 18, which will be described below, abuts against a lower surface 16C of the annular member 16 (refer to FIG. 11).

The second communication passages 14 serve to constantly establish the communication between the chamber C2 on the rod guide 9 side and the chamber C1 on the first piston 6 side in the rod-side chamber C corresponding to the rod guide 9 side in the inner cylinder 5. The second communication passages 14 are formed between the inner periphery of the inner cylinder 5 and the outer periphery of the second cylinder 12. More specifically, the second communication passages 14 include a plurality of recessed grooves, such as three recessed grooves, provided in an axially extending manner on the outer peripheral surfaces of the bottom portion 12A and the cylinder portion 12B of the second cylinder 12, and are formed between the second cylinder 12 and the inner peripheral surface of the inner cylinder 5.

The second communication passages 14 function as a restrictor that restricts the flow amount of the hydraulic oil to a small amount when the hydraulic oil flows between the chamber C2 on the rod guide 9 side and the chamber C1 on the first piston 6 side. Due to this configuration, the movement of the second cylinder 12 can be restricted to a small movement with the first communication passage 13 blocked (the state illustrated in FIG. 11). On the other hand, the second communication passages 14 secure the flow of the hydraulic oil so as to allow the second cylinder 12 to move toward the first piston 6 side even with the first communication passage 13 blocked.

Figure 2:
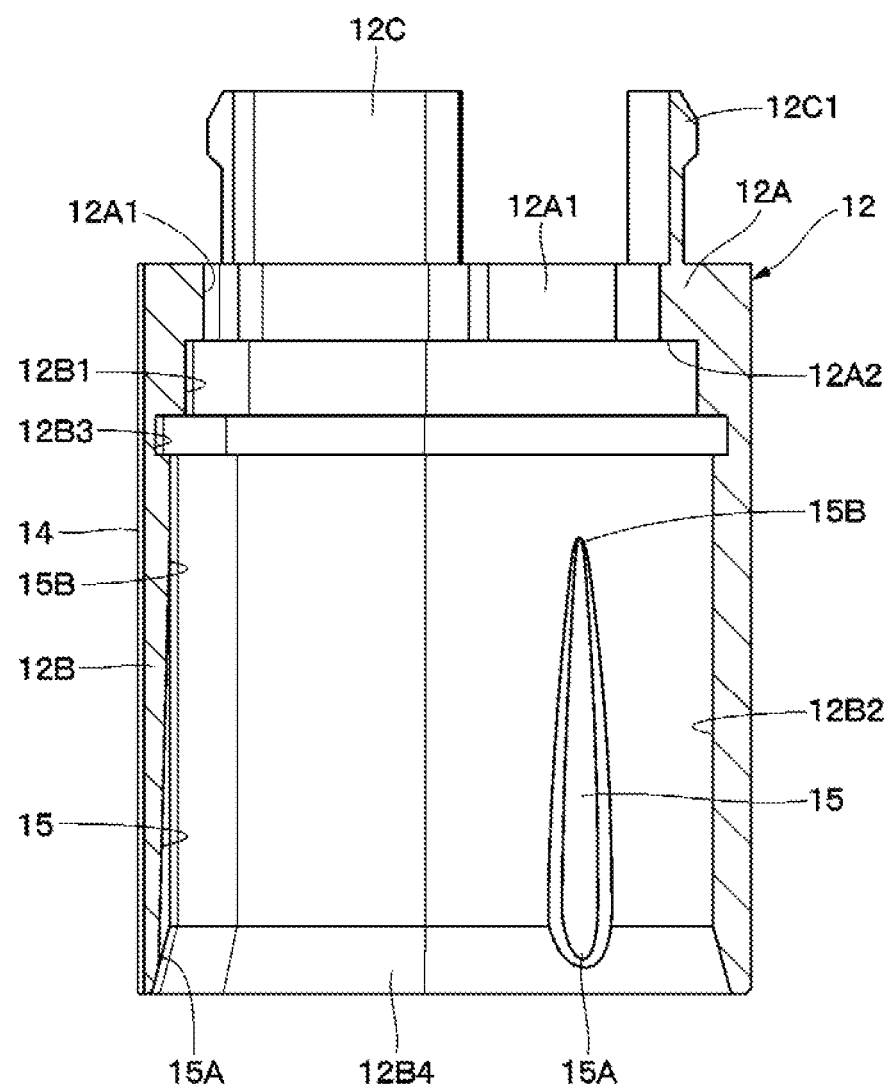
FIG. 2 is a vertical cross-sectional view illustrating a second cylinder in FIG. 1 in an enlarged manner.
Figure 3:
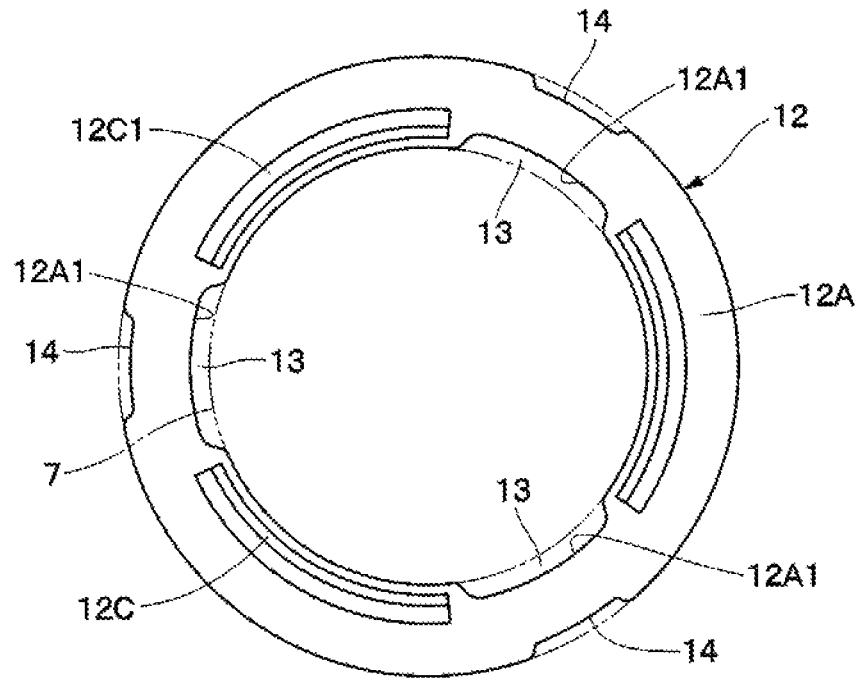
FIG. 3 is a plan view of the second cylinder illustrated in FIG. 2 as viewed from above.
Figure 4:
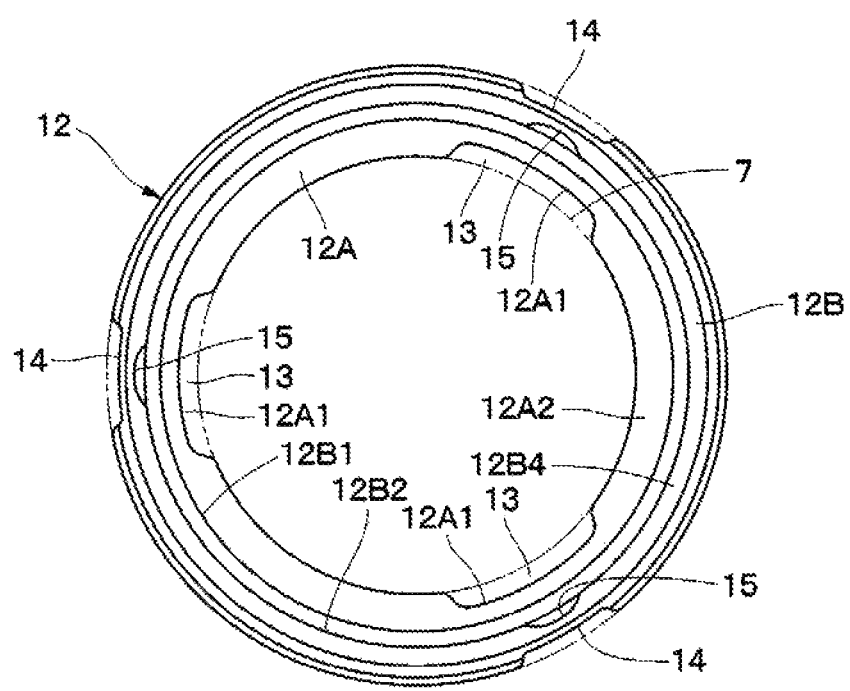
FIG. 4 is a bottom view of the second cylinder illustrated in FIG. 2 as viewed from below.

The restrictor oil grooves 15 form a part of the passage area variable mechanism 22, which will be described below, and are provided on the way of the first communication passage 13. More specifically, the restrictor oil grooves 15 are arranged at a plurality of portions, such as three portions, on the large-diameter portion 12B2 of the cylinder portion 12B forming the second cylinder 12 at the circumferential intervals. As illustrated in FIG. 2, each of the restrictor oil grooves 15 is formed into a wide and deeply-grooved large flow passage 15A on the lower taper surface portion 12B4 side and a narrow and shallowly-grooved small flow passage 15B on the upper side of the large-diameter portion 12B2. In other words, each of the restrictor oil grooves 15 is formed in such a manner that the groove width and the groove depth gradually reduce from the lower side toward the upper side. Due to this configuration, each of the restrictor oil grooves 15 can gradually reduce the flow of the hydraulic oil due to the second piston 18, which will be described below, being inserted into the large-diameter portion 12B2 of the cylinder portion 12B and moving from the large flow passage 15A toward the small flow passage 15B.

Figure 10:
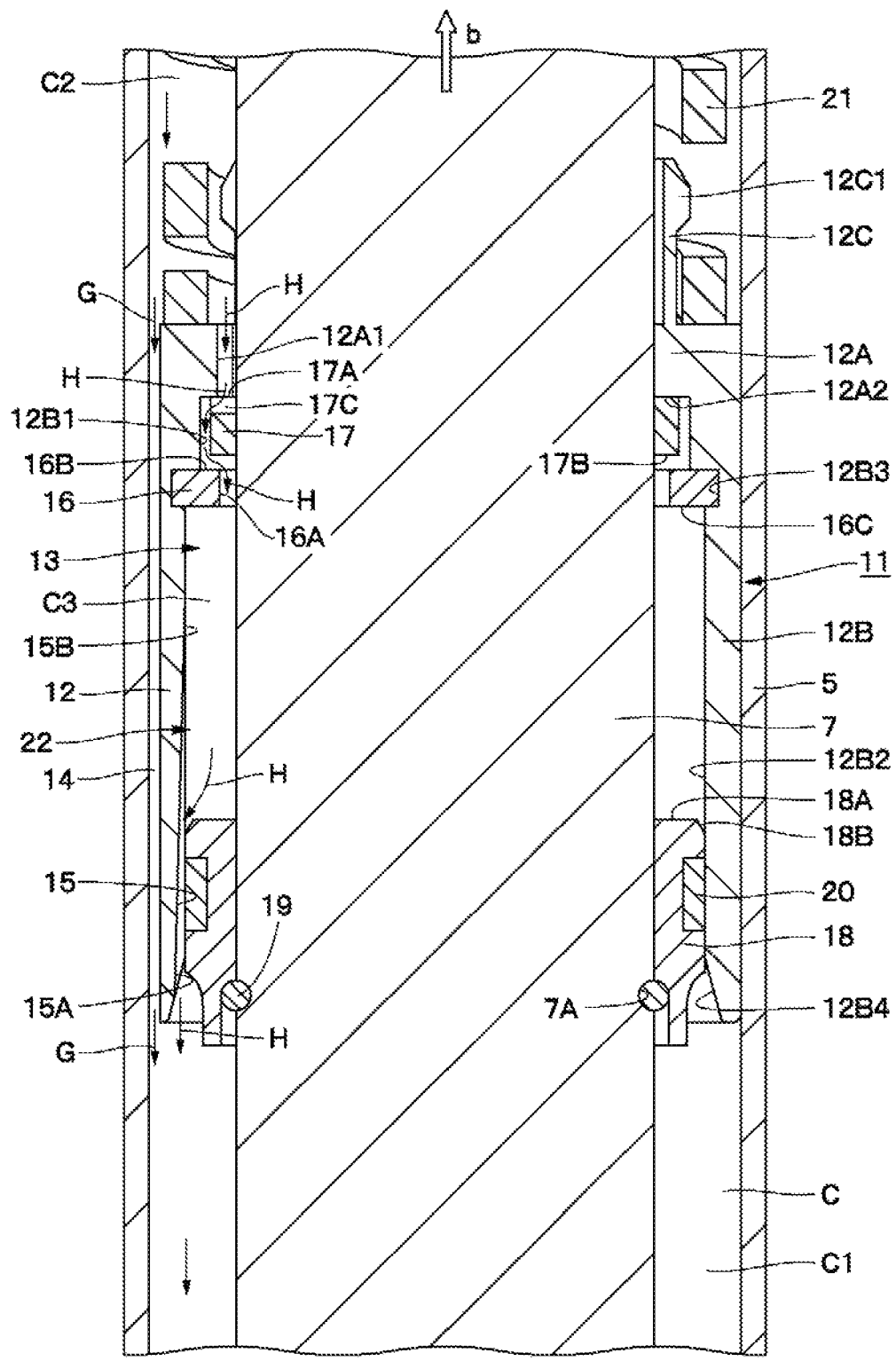
FIG. 10 is a vertical cross-sectional view illustrating a flow of the hydraulic oil when the second piston is inserted in the second cylinder in the extension stroke of the piston rod in an enlarged manner.

When the second piston 18 reaches the large flow passage 15A, a passage is formed between each of the restrictor oil grooves 15 and the outer peripheral surface of this second piston 18. A value acquired by adding the passage areas of these large flow passages 15A at the three portions is set to a larger value than the passage area of a restrictor passage 17C of the annular valve member 17. Due to this configuration, as illustrated in FIG. 10, fluid in a chamber C3, which is formed by the inside of the second cylinder 12 and the second piston 18 that is formed when the second piston 18 reaches the large flow passages 15A, flows to the chamber C1 on the first piston 6 side via the large flow passages 15A, and therefore the resistance force can be prevented from excessively increasing. Therefore, the restrictor oil grooves 15 can generate the resistance force together with the restrictor passage 17C of the annular valve member 17 against the piston rod 7 during the extension stroke.

The annular member 16 is attached to the attachment groove portion 12B3 of the cylinder portion 12B forming the second cylinder 12 in a fitted state. The annular member 16 is formed by an annular member rectangular in cross section, and the inner diameter dimension thereof is set to a larger dimension than the outer diameter dimension of the piston rod 7. Due to this configuration, the annular member 16 forms a part of the first communication passage 13 between the inner peripheral surface 16A and the outer peripheral surface of the piston rod 7. In this case, the diameter dimension of the inner peripheral surface 16A of the annular member 16 is set to a dimension sufficiently larger than the outer diameter dimension of the piston rod 7 so as to allow the hydraulic oil to flow between the chamber C1 on the first piston 6 side and the chamber C2 on the rod guide 9 side smoothly (so as not to generate high flow resistance).

Figure 11:
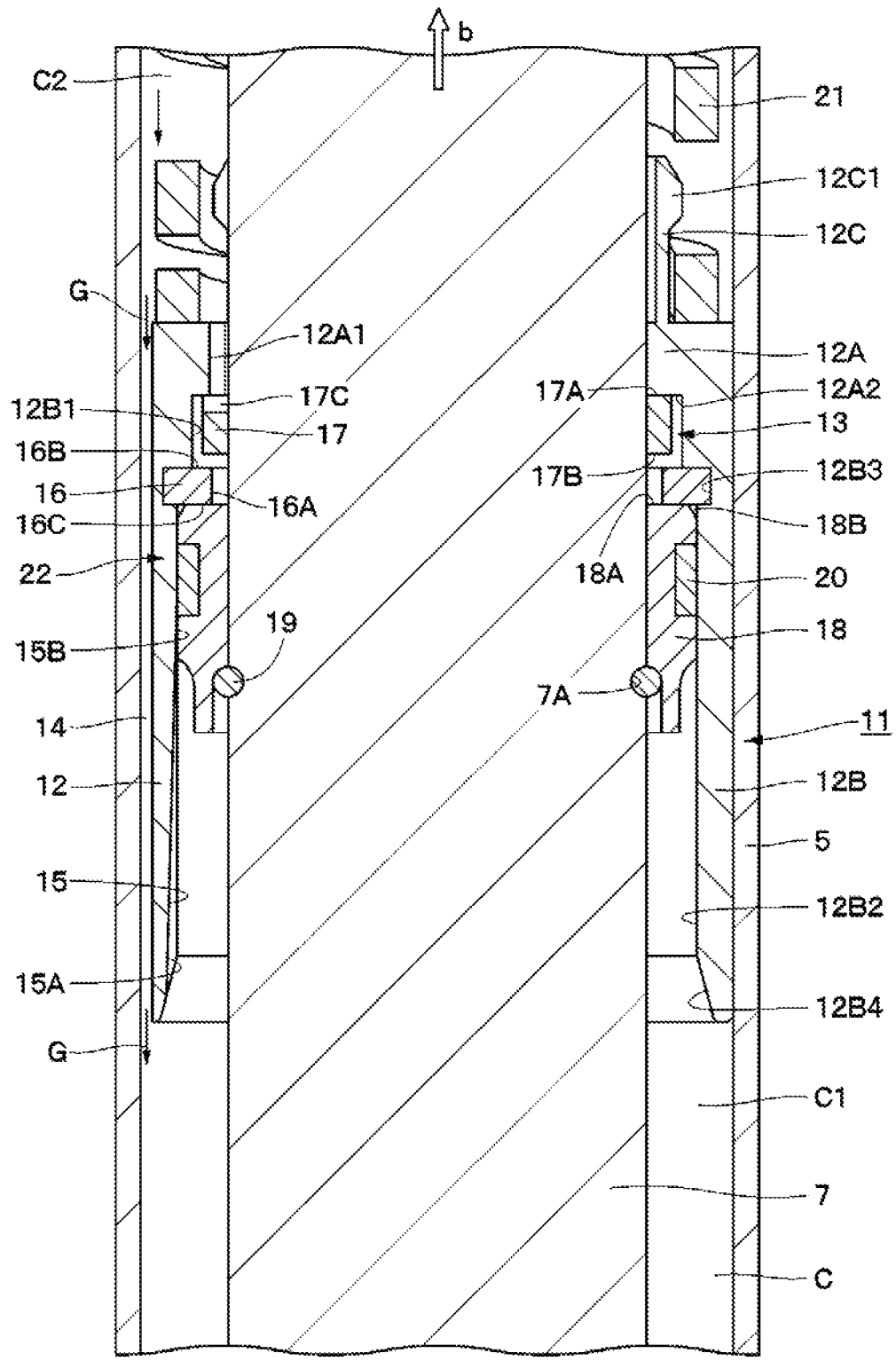
FIG. 11 is a cross-sectional view illustrating a flow of the hydraulic oil with the piston rod in a full extension state in an enlarged manner.

Further, as illustrated in FIG. 8, a lower surface 17B of the annular valve member 17, which will be described below, abuts against/moves away from an upper surface 16B of the annular member 16. On the other hand, as illustrated in FIG. 11, the lower surface 16C of the annular member 16 forms a valve seat against which an upper surface 18A of the second piston 18 abuts so as to be able to open and close the valve. In a blocked state with the upper surface 18A of the second piston 18 in abutment with the lower surface 16C of the annular member 16 (a valve-closed state), the first communication passage 13 is blocked.

Figure 5:
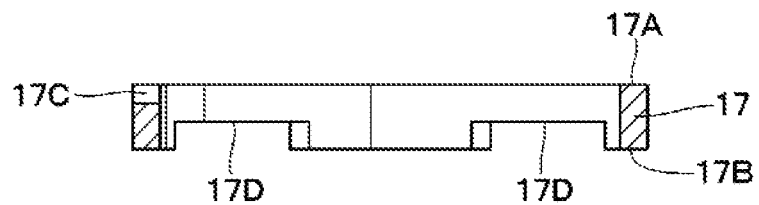
FIG. 5 is a vertical cross-sectional view of an annular valve member in FIG. 1 in an enlarged manner.
Figure 6:
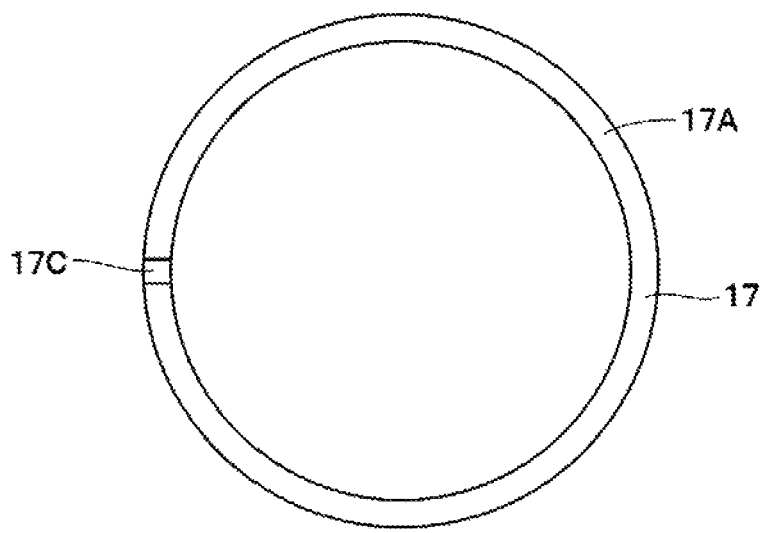
FIG. 6 is a plan view of the annular valve member illustrated in FIG. 5 as viewed from above.
Figure 7:
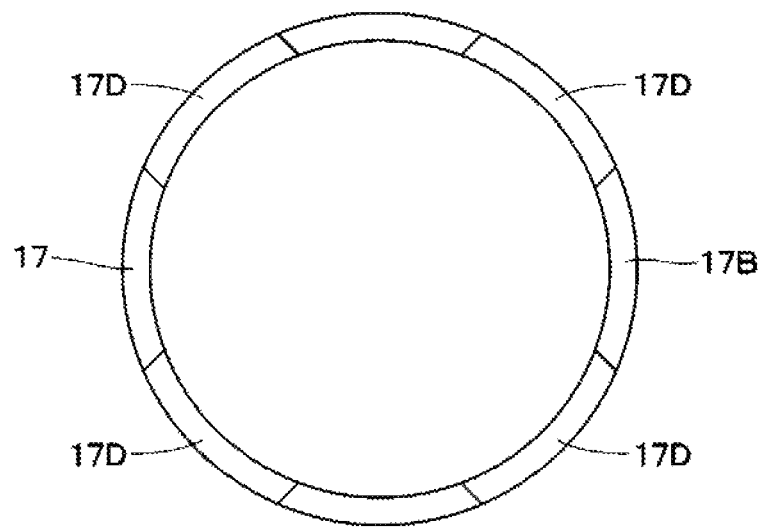
FIG. 7 is a bottom view of the annular valve member illustrated in FIG. 5 as viewed from below.

The annular valve member 17 is disposed between the piston rod 7 and the small-diameter portion 12B1 of the cylinder portion 12B forming the second cylinder 12, and is provided without any space generated so as to cause no flow of the hydraulic fluid between the piston rod 7 and the inner periphery of the annular valve member 17. On the other hand, the annular valve member 17 is movable relative to the piston rod 7 by abutting against the bottom portion 12A of the second cylinder 12 or the upper surface 16B of the annular valve seat 16 due to the movement of the piston rod 7. As illustrated in FIGS. 5 to 7, the annular valve member 17 is formed by an annular member rectangular in cross section, and includes the upper surface 17A and the lower surface 17B. Further, the restrictor passage 17C is provided on the upper surface 17A of the annular valve member 17. The restrictor passage 17C radially extends while having a small passage area. Large passages 17D are provided at a plurality of portions, such as four portions, on the lower surface 17B side at circumferential intervals for allowing the hydraulic fluid to flow non-resistively.

The inner diameter dimension of the annular valve member 17 is set to a dimension slightly larger than the outer diameter dimension of the piston rod 7. Due to this configuration, the annular valve member 17 moves in a direction indicated by an arrow a (downward) by following the piston rod 7, and brings the lower surface 17B into abutment with the upper surface 16B of the annular member 16, as illustrated in FIG. 8 during the compression stroke of the piston rod 7. On the other hand, the annular valve member 17 moves in a direction indicated by an arrow b (upward) by following the piston rod 7, and brings the upper surface 17A into abutment with the annular valve seat 12A2 of the bottom portion 12A, as illustrated in FIG. 9 during the extension stroke of the piston rod 7.

On the other hand, the outer diameter dimension of the annular valve member 17 is set to a dimension slightly smaller than the inner diameter dimension of the small-diameter portion 12B1. This configuration allows the hydraulic oil to flow without applying high resistance thereto because an annular passage is generated between the annular valve member 17 and the small-diameter portion 12B1.

The lower surface 17B of the annular valve member 17 can abut against/move away from the upper surface 16B of the annular member 16. As illustrated in FIG. 9, the annular valve member 17 can increase the flow resistance against the hydraulic oil in the first communication passage 13 due to the restrictor passage 17C by bringing the upper surface 17A into abutment with the annular valve seat 12A2 of the bottom portion 12A when the piston rod 7 extends in the direction indicated by the arrow b. Further, as illustrated in FIG. 8, when the piston rod 7 compresses in the direction indicated by the arrow a, the upper surface 17A of the annular valve member 17 moves away from the annular valve seat 12A2 of the bottom portion 12A, which allows the hydraulic oil to flow with low resistance in the first communication passage 13 due to each of the large passages 17D.

In this manner, as indicated by an arrow D in FIG. 8, the annular valve member 17 can permit the hydraulic oil to flow from the chamber C1 on the first piston 6 side toward the chamber C2 on the rod guide 9 side due to each of the large passages 17D. On the other hand, as indicated by an arrow F in FIG. 9 and an arrow H in FIG. 10, when the hydraulic oil flows from the chamber C2 on the rod guide 9 side toward the chamber C1 on the first piston 6 side, a blocked state is substantially established because the hydraulic oil only flows through just the restrictor passage 17C for securing the minimum passage area so as to prevent a hydraulic lock from occurring. Due to this configuration, the annular valve member 17 forms, together with the annular valve seat 12A2, a check valve that permits the hydraulic oil to flow from the chamber C1 on the first piston 6 side toward the chamber C2 on the rod guide 9 side and prohibits the flow in the opposite direction.

The second piston 18 is positioned between the first piston 6 and the second cylinder 12 and is provided on the outer peripheral side of the piston rod 7. The second piston 18 is provided so as to be able to move along with the movement of the piston rod 7 to be fitted into the cylinder portion 12B of the second cylinder 12. The second piston 18 is integrally attached to the outer peripheral side of the piston rod 7 with use of the stop ring 19 fitted in the annular groove 7A of this piston rod 7.

The second piston 18 has a vertically extending rectangular shape in cross section, and the upper surface 18A thereof forms a valve body that abuts against/moves away from (is seated onto/separated from) the lower surface 16C of the annular member 16. In other words, the second piston 18 is inserted into the large-diameter portion 12B2 of the cylinder portion 12B of the second cylinder 12 when the piston rod 7 moves in the extension direction by a distance corresponding to a preset dimension or longer. When the piston rod 7 further extends, the second piston 18 brings the upper surface 18A thereof into abutment with the lower surface 16C of the annular member 16, thereby blocking the first communication passage 13.

Further, a chamfered portion 18B is provided around the upper surface 18A. The chamfered portion 18B gradually reduces in diameter toward the upper side. This chamfered portion 18B serves to, in collaboration with the taper surface 12B4 of the cylinder portion 12B, smoothly guide the second piston 18 into the large-diameter portion 12B2 of the cylinder portion 12B when the piston rod 7 extends.

Further, an annular piston ring 20 is provided while being externally fitted on the outer peripheral side of the second piston 18. This piston ring 20 serves to seal between the large-diameter portion 12B2 and the second piston 18 to thus restrict the flow of the hydraulic oil, by bringing the outer peripheral surface thereof into sliding contact with the inner peripheral surface of the large-diameter portion 12B2 when the second piston 18 enters the large-diameter portion 12B2 of the cylinder portion 12B.

The spring member 21 forms the rebound spring, and is provided on the outer peripheral side of the piston rod 7 in the inner cylinder 5. Further, the spring member 21 is disposed between the rod-side chamber C, i.e., the second cylinder 12 and the rod guide 9. Further, the spring member 21 includes a vertically extendable and compressible compression coil spring, and the upper end portion thereof is attached to, for example, the rod guide 9. On the other hand, the fitted portion 12C of the second cylinder 12 is integrally fittedly inserted in the lower end portion of the spring member 21. This allows the spring member 21 to axially position the second cylinder 12 in the rod-side chamber C except when the piston rod 7 largely extends. The spring member 21 forming the rebound spring serves to, for example, suppress a roll of the vehicle body when the vehicle turns a corner by restricting the extension of the piston rod 7. The spring member 21 may be configured in such a manner that the upper end portion thereof is attached to the inner cylinder 5.

The passage area variable mechanism 22 is provided in the first communication passage 13 of the second cylinder 12. The passage area variable mechanism 22 serves to reduce the passage area of the first communication passage 13 during the extension stroke of the piston rod 7 and increase the passage area of the first communication passage 13 during the compression stroke of the piston rod 7. The passage area variable mechanism 22 is constructed using the valve structure formed by the bottom portion 12A of the second cylinder 12 and the annular valve member 17, the valve structure formed by the annular member 16 and the second piston 18, and the valve structure formed by each of the restrictor oil grooves 15 and the second piston 18. Further, the passage area variable mechanism 22 positions the second cylinder 12 with use of the spring member 21 to allow the annular valve member 17 to be seated onto/separated from the bottom portion 12A (the annular valve seat 12A2) of the second cylinder 12 and allow the second piston 18 to be inserted into/extracted from the second cylinder 12. In this manner, the spring member 21 forms a part of the passage area variable mechanism 22.

The hydraulic shock absorber 1 according to the present embodiment is configured in the above-described manner. Then, the hydraulic shock absorber 1 is mounted on the vehicle in such a manner that the upper end side of the piston rod 7 and the bottom cap 2B side (the lower end side) of the outer cylinder 2 are attached to the vehicle body side and the axle side (both are not illustrated) of the automobile. As a result, when a vibration occurs while the automobile is running, a compression-side damping force and an extension-side damping force are generated with the aid of the disk valves 6C and 6D of the first piston 6 and the like when the piston rod 7 axially compresses into/extends out of the inner cylinder 5 and the outer cylinder 2, thereby being able to absorb the vertical vibration of the vehicle so as to damp it.

Now, in the hydraulic shock absorber 1, it is difficult to restrict the full extension of the piston rod 7 and control an operation of switching the piston rod 7 from the full extension to the compression operation, and this difficulty causes a failure to acquire a stable resistance force and a reduction in the ride comfort. However, in the present embodiment, the hydraulic shock absorber 1 can stably control the resistance force at the time of the full extension of the piston rod 7 and the compression operation from the full extension.

More specifically, the hydraulic shock absorber 1 according to the present invention performs the control of the resistance force when the piston rod 7 compresses, the control of the resistance force when the piston rod 7 extends toward the full extension position, and the control of the switching operation from the full extension position to the compression operation, and these control procedures will be described with reference to FIGS. 8 to 11.

First, FIG. 8 illustrates the normal compression stroke of the piston rod 7 irrespective of the full extension of the piston rod 7. During the compression stroke, the piston rod 7 moves in the direction indicated by the arrow a. At this time, as moving in the direction indicated by the arrow a (downward) together with the piston rod 7, the lower surface 17B abuts against the upper surface 16B of the annular member 16.

As a result, the first communication passage 13 can allow the hydraulic oil to flow from the chamber C1 on the first piston 6 side to the chamber C2 on the rod guide 9 side via the passage defined by the space between the large-diameter portion 12B2 of the cylinder portion 12B forming the second cylinder 12 and the outer peripheral surface of the piston rod 7, the passage defined by the space between the inner peripheral surface 16A of the annular member 16 and the outer peripheral surface of the piston rod 7, each of the large passages 17D of the annular valve member 17, the passage defined by the space between the small-diameter portion 12B1 and the annular valve member 17, and each of the inner passages 12A1 of the bottom portion 12A as indicated by the arrow D.

In this case, because the annular valve member 17 moves away from the annular valve seat 12A2 of the bottom portion 12A and the second piston 18 does not enter the large-diameter portion 12B2, the first communication passage 13 is in a fully opened state in which minimum resistance is applied to the hydraulic oil flowing therein. The first communication passage 13 allows the hydraulic oil to flow therethrough as a passage having a large passage area in this fully opened state. In addition, the hydraulic oil can also flow from the chamber C1 on the first piston 6 side to the chamber C2 on the rod guide 9 side through each of the second communication passages 14 as indicated by an arrow E although the amount thereof is just slight. Further, the hydraulic oil can also flow via the first communication passage 13 in the fully opened state and each of the second communication passages 14 during the normal extension stroke (not illustrated) of the piston rod 7.

Therefore, during the compression stroke and the extension stroke in normal times irrespective of the full extension of the piston rod 7, the hydraulic shock absorber 1 can generate a stable damping force with the aid of the disk valves 6C and 6D of the first piston 6 and the bottom valve 5A, thereby achieving excellent ride comfort.

FIGS. 9 to 11 illustrate the extension stroke when the piston rod 7 largely extends toward the full extension position. During this extension stroke, the piston rod 7 moves upward in the direction indicated by the arrow b, and the hydraulic oil flows from the chamber C2 on the rod guide 9 side toward the chamber C1 on the first piston 6 side via the first communication passage 13 and each of the second communication passages 14.

FIG. 9 illustrates a stroke at a first stage when the piston rod 7 largely extends in the extension stroke of the piston rod 7. During the extension stroke at this first stage, the piston rod 7 moves in the direction indicated by the arrow b. At this time, the annular valve member 17 moves in the direction indicated by the arrow b (upward) together with the piston rod 7, and the upper surface 17A thereof abuts against the annular valve seat 12A2 of the bottom portion 12A of the second cylinder 12. The resistance against the flow of the hydraulic oil can be enhanced by the restrictor passage 17C with the upper surface 17A of the annular valve member 17 in abutment with the annular valve seat 12A2 of the bottom portion 12A.

More specifically, as indicated by the arrow F in FIG. 9, the hydraulic oil flowing in the first communication passage 13 flows with the flow amount thereof restricted by the restrictor passage 17C. In addition, the hydraulic oil can also flow from the chamber C2 on the rod guide 9 side to the chamber C1 on the first piston 6 side through each of the second communication passages 14 as indicated by an arrow G although the amount thereof is just slight. As a result, a resistance force corresponding to the first stage can be applied to the extension operation of the piston rod 7.

FIG. 10 illustrates an extension stroke when the resistance against the hydraulic oil flowing in the first communication passage 13 gradually increases in the extension stroke of the piston rod 7. During the extension stroke at this second stage, the second piston 18 is inserted into the large-diameter portion 12B2 of the cylinder portion 12B forming the second cylinder 12. At the time of this insertion of the second piston 18, the taper surface portion 12B4 is formed on the opening side of the cylinder portion 12B, and the chamfered portion 18B is formed on the second piston 18. Therefore, this taper surface portion 12B4 and the chamfered portion 18B guide the second piston 18 by contacting each other, thereby allowing the second piston 18 to be smoothly inserted into the large-diameter portion 12B2 even if the second piston 18 and the large-diameter portion 12B2 of the cylinder portion 12B are out of alignment with each other.

When the second piston 18 is inserted in the large-diameter portion 12B2 of the cylinder portion 12B, this second piston 18 covers each of the restrictor oil grooves 15 from the inner peripheral side, and therefore the passage area of the first communication passage 13 is narrowed due to the restrictor oil grooves 15 at the three portions. In other words, as indicated by the arrow H, the hydraulic oil flowing in the first communication passage 13 is transmitted out to the chamber C1 on the first piston 6 side by passing through each of the restrictor oil grooves 15. In this case, the second piston 18 moves from the large flow passage 15A toward the small flow passage 15B of each of the restrictor oil grooves 15 along with the movement of the piston rod 7 in the direction indicated by the arrow b. As a result, the hydraulic shock absorber 1 can gradually narrow the first communication passage 13, thereby smoothly increasing the resistance force.

FIG. 11 illustrates an extension stroke when the first communication passage 13 is blocked to prevent the piston rod 7 from exceeding the full extension limit in the extension stroke of the piston rod 7. During the extension stroke at this third stage, the second piston 18 inserted in the large-diameter portion 12B2 of the cylinder portion 12B forming the second cylinder 12 moves in the direction indicated by the arrow b together with the piston rod 7, and abuts against the annular member 16 at the full extension position of the piston rod 7. Therefore, the upper surface 18A of the second piston 18 abuts against the lower surface 16C of the annular member 16, and blocks the passage between the inner peripheral surface 16A of the annular member 16 and the piston rod 7. As a result, the hydraulic shock absorber 1 can block the first communication passage 13, thereby restricting the movement of the second cylinder 12, i.e., the extension of the piston rod 7 to slight extension realized by each of the second communication passages 14.

Further, when the piston rod 7 is switched from the full extension position to the compression operation, the hydraulic shock absorber 1 can allow the second piston 18 to move toward the opening side of the second piston 12 by allowing the hydraulic oil to flow via the second communication passages 14. As a result, when the piston rod 7 compresses from the full extension state, the hydraulic shock absorber 1 can control the resistance force against the movement of the piston rod 7 to a low force by allowing the hydraulic oil to flow via the first communication passage 13 and the second communication passages 14.

In this manner, according to the present embodiment, the stopper mechanism 11, which operates when the piston 7 extends and moves toward the upper end portion in the inner cylinder 5, is provided movably relative to the piston rod 7, and includes the second cylinder 12 including the bottom portion 12A on the upper end side in the inner cylinder 5 and the cylinder portion 12B extending from this bottom portion 12A toward the lower end side, and the second piston 18 provided so as to be able to move along with the movement of the piston rod 7 to be fitted to the second cylinder 12. Further, the spring member 21 is provided between the second cylinder 12 and the rod guide 9.

Therefore, the hydraulic shock absorber 1 can control the piston rod 7 so as to prevent it from exceeding the full extension limit with the aid of the second cylinder 12 and the second piston 18 provided on the lower end side of the spring member 21. As a result, the hydraulic shock absorber 1 can stabilize the resistance force when the piston rod 7 extends, thereby acquiring excellent ride comfort.

The first communication passage 13, which establishes the communication between the inside of the second cylinder 12 and the chamber C2 on the rod guide 9 side, is provided at the second cylinder 12. The passage area variable mechanism 22 is provided in this first communication passage 13. The passage area variable mechanism 22 reduces the passage area of the first communication passage 13 during the extension stroke of the piston rod 7 and increases the passage area of the first communication passage 13 during the compression stroke of the piston rod 7. As a result, the hydraulic shock absorber 1 can prevent the piston rod 7 from exceeding the full extension limit due to the high resistance force during the extension stroke of the piston rod 7. On the other hand, the hydraulic shock absorber 1 can stabilize the control by prioritizing the damping force on the first piston 6 side during the compression stroke of the piston rod 7, thereby also acquiring excellent ride comfort in terms thereof.

The passage area variable mechanism 22 is configured as the check valve. As a result, the passage area variable mechanism 22 can permit the hydraulic oil to flow from the chamber C1 on the first piston 6 side toward the chamber C2 on the rod guide 9 side and prohibit the flow in the opposite direction.

The second communication passages 14, which establish the constant communication between the rod guide 9 side (the chamber C2) and the first piston 6 side (the chamber C1) in the inner cylinder 5, are provided at the second cylinder 12. Due to this provision, the hydraulic shock absorber 1 can allow the hydraulic oil to flow between the rod guide 9 side and the first piston 6 side in the inner cylinder 5 via the second communication passages 14 when the piston rod 7 is switched to the compression operation even with the first communication passage 13 blocked when the piston rod 7 is located at the full extension position. As a result, the hydraulic shock absorber 1 can reduce the resistance force to a low force when the piston 7 compresses from the full extension state.

The second communication passages 14 are formed between the inner periphery of the inner cylinder 5 and the outer periphery of the second cylinder 12. As a result, the second communication passages 14 can be easily provided only by forming grooves on the outer periphery of the second cylinder 12.

The second cylinder 12 is made from the resin material, and therefore can reduce in weight in addition to being able to be easily manufactured.

The embodiment has been described referring to the example when the inner passages 12A1 of the bottom portion 12A forming the second cylinder 12, the second communication passages 14, and the restrictor oil grooves 15 are each provided at three portions. However, the present invention is not limited thereto, and may be configured in such a manner that, for example, the inner passage(s) 12A1, the second communication passage(s) 14, and the restrictor oil groove(s) 15 are each provided at one portion, two portions, or four or more portions.

Further, the embodiment has been described referring to the example when the second piston 18 is attached to the piston rod 7 via the stop ring 19. However, the present invention is not limited thereto, and may be configured in such a manner that an annular fitted portion protruding radially inward is provided on the second piston and the second piston is attached to the piston rod 7 by fitting this fitted portion in the annular groove 7A of the piston rod 7.

The embodiment has been described referring to the example when the second cylinder 12 is entirely made from the resin material. However, the present invention is not limited thereto, and may be configured in such a manner that, for example, most of the second cylinder is formed using a metallic material and a resin ring member is mounted on the outer peripheral side of the metallic second cylinder.

On the other hand, the embodiment has been described referring to the example when the restrictor oil grooves 15 each having the gradually reducing groove width and groove depth from the lower side toward the upper side are provided on the large-diameter portion 12B2 of the cylinder portion 12B forming the second cylinder 12. However, the present invention is not limited thereto, and the restrictor oil grooves 15 may be removed in a case where, for example, the large-diameter portion of the cylinder portion is shaped in a tapering manner so as to reduce in diameter dimension from the lower side (the opening side) toward the upper side (the deep side). In other words, the restrictor passage can be formed between the taper surface and the second piston.

Further, the embodiment has been described citing the twin-tube shock absorber including the outer cylinder 2 and the inner cylinder 5 as an example. However, the present invention is not limited thereto, and can also be applied to a single-tube shock absorber provided by slidably fittedly inserting the piston inside a single cylinder.

Further, the embodiment has been described citing the hydraulic shock absorber 1 mounted on each of the wheel sides of the four-wheeled automobile as a representative example. However, the present invention is not limited thereto, and may be embodied by, for example, a hydraulic shock absorber for use in a two-wheeled vehicle, or may be employed for a cylinder apparatus for use in various kinds of machines, buildings, and the like that are not a vehicle.

Possible configurations as a cylinder apparatus based on the above-described embodiments include the following examples.

A first configuration of a cylinder apparatus includes a first cylinder sealingly containing hydraulic fluid therein, a first piston slidably fitted in the first cylinder and defining an inside of this first cylinder into a rod-side chamber and a bottom-side chamber, a piston rod coupled with the first piston, a closing member provided on one end side of the first cylinder and configured to close the first cylinder with the piston rod inserted therethrough, and a stopper mechanism configured to operate when the piston rod extends and moves toward an end portion inside the first cylinder. The stopper mechanism includes a second cylinder provided movably relative to the piston rod and including a bottom portion on the one end side of the first cylinder and a cylinder portion extending from this bottom portion toward the other end side, and a second piston provided so as to be able to move along with a movement of the piston rod to be fitted to the second cylinder. A spring member is provided between the second cylinder and the closing member.

As a second configuration of the cylinder apparatus, in the first configuration, a first communication passage is provided at the second cylinder. The first communication passage is configured to establish communication between an inside of the second cylinder and a chamber on the closing member side. A passage area variable mechanism is provided in this first communication passage. The passage area variable mechanism is configured to reduce a passage area of the first communication passage during an extension stroke of the piston rod and increase the passage area of the first communication passage during a compression stroke of the piston rod.

As a third configuration of the cylinder apparatus, in the second configuration, the passage area variable mechanism is a check valve.

As a fourth configuration of the cylinder apparatus, in the first or second configuration, a second communication passage is provided at the second cylinder. The second communication passage is configured to constantly establish communication between the closing member side and the first piston side in the first cylinder.

As a fifth configuration of the cylinder apparatus, in the third configuration, the second communication passage is formed between an inner periphery of the first cylinder and an outer periphery of the second cylinder.

As a sixth configuration of the cylinder apparatus, in the first to fourth configurations, the second cylinder is made from a resin material.

The present invention is not limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2018-094513 filed on May 16, 2018. The entire disclosure of Japanese Patent Application No. 2018-094513 filed on May 16, 2018 including the specification, the claims, the drawings, and the abstract is incorporated herein by reference in its entirety.

REFERENCE SIGN LIST 1 hydraulic shock absorber (cylinder apparatus)
5 inner cylinder (first cylinder)
6 first piston
7 piston rod
9 rod guide (closing member)
11 stopper mechanism
12 second cylinder
12A bottom portion
12B cylinder portion
13 first communication passage
14 second communication passage
18 second piston
21 spring member
22 passage area variable mechanism
B bottom-side chamber
C rod-side chamber
C1 chamber on the first piston side
C2 chamber on the rod guide side (chamber on the closing member side)

The invention claimed is:

1. A cylinder apparatus comprising:
a first cylinder sealingly containing hydraulic fluid therein;
a first piston slidably fitted in the first cylinder and defining an inside of this first cylinder into a rod-side chamber and a bottom-side chamber;
an oil passage provided at the first piston and configured to establish communication between the rod-side chamber and the bottom-side chamber;
a disk valve configured to suppress a movement of the hydraulic fluid flowing in the oil passage to generate a damping force;
a piston rod coupled with the first piston;
a closing member provided on one end side of the first cylinder and configured to close the first cylinder with the piston rod inserted therethrough; and
a stopper mechanism configured to operate when the piston rod extends and moves toward an end portion inside the first cylinder,
wherein the stopper mechanism includes:
a second cylinder provided movably relative to the piston rod, the second cylinder including a bottom portion on the one end side of the first cylinder and a cylinder portion extending from the bottom portion toward the other end side of the first cylinder, at least a portion of an outer periphery of the second cylinder being configured to be slidably moved relative to the first cylinder; and
a second piston provided so as to be able to move along with a movement of the piston rod to be fitted to the second cylinder,
wherein a spring member is provided between the second cylinder and the closing member,
wherein a first communication passage is provided at the second cylinder, the first communication passage being configured to establish communication between an inside of the second cylinder and a chamber on the closing member side, the first communication passage being provided at the bottom portion, and
wherein a passage area variable mechanism is provided in the first communication passage, the passage area variable mechanism being configured to reduce a passage area of the first communication passage during an extension stroke of the piston rod and increase the passage area of the first communication passage during a compression stroke of the piston rod.

2. The cylinder apparatus according to claim 1, wherein the passage area variable mechanism is a check valve.

3. The cylinder apparatus according to claim 1, wherein a second communication passage is provided at the second cylinder, the second communication passage being configured to constantly establish communication between the closing member side and the first piston side in the first cylinder.

4. The cylinder apparatus according to claim 3, wherein the second communication passage is formed between an inner periphery of the first cylinder and an outer periphery of the second cylinder.

5. The cylinder apparatus according to claim 1, wherein the second cylinder is made from a resin material.

6. The cylinder apparatus according to claim 1, wherein the passage area variable mechanism includes a restrictor oil groove which is formed in such a manner that the groove width and the groove depth gradually reduce from the lower side toward the upper side.

* * * * *